NOISE SUPPRESSION SYSTEM

Filed Dec. 23, 1957

INVENTOR.
DANIEL CRONIN

BY S.C. Yuter

ATTORNEY

United States Patent Office 3,057,968

Patented Oct. 9, 1962

3,057,968

NOISE SUPPRESSION SYSTEM

Daniel Cronin, New York, N.Y., assignor to Bell Sound Studios, Inc., New York, N.Y., a corporation of New York Filed Dec. 23, 1957, Ser. No. 704,761
6 Claims. (Cl. 179—100.2)

This invention relates to noise suppression and more particularly to the suppression of background noise unintentionally present on magnetic tape.

Magnetic tapes that have been stored for some time often contain "print through," that is, the signals recorded on one layer of magnetic tape in a reel are induced on the adjacent layer. During playback, these induced signals or "magnetic ghosts" produce a pre-echo or post-echo one or two seconds removed from the true signal. Since orchestral music is recorded in surroundings having a reverberation time long enough to mask the echo, the magnetic ghosts are usually not noticed during playback. In general, most recordings of continuing sound mask the echo as well as other types of noise.

However, there are other commonly recorded programs that are more revealing of this phenomena. For example, speech recordings such as poetry readings or language instruction point up the defect since there are usually pauses between words and sentences.

It is, therefore, a general object of the invention to provide improved means for suppressing background noise.

It is a further object of the invention to provide improved means for suppressing background noise which at the same time does not distort the desired signal.

It is a more specific object of the invention to provide means for suppressing in the reproduction of signals from a magnetic tape the spurious echoes resulting from induction between adjacent turns on a reel of magnetic tape.

Briefly, in accordance with one embodiment of the invention, apparatus is provided for suppressing low level noise signals in the output circuit of a signal source. The apparatus includes signal blocking means for preventing the transmission of signals having less than predetermined positive and negative amplitudes. Biasing means are disposed in series with the signal blocking means for controlling the signal threshold of operation of the signal blocking means.

In accordance with a feature of the invention which prevents distortion of desired signals, means are provided which is responsive to the desired signals to disable the signal blocking means.

It has been found that when employing apparatus in accordance with the above embodiments of the invention for the reproduction of speech, the reappearance of background hiss during the disabled periods gives the impression of severe modulation noise. The pauses between words and phrases have an unreal sounding dead silence because, in general, each word reproduced is ordinarily accompanied by room noise, tape hiss, and the usual tube noises of the amplifier stages. Accordingly, to provide smooth and unobtrusive reproduction, a hiss generator is provided as a feature of the invention to simulate the expected background noises.

Figure 1:
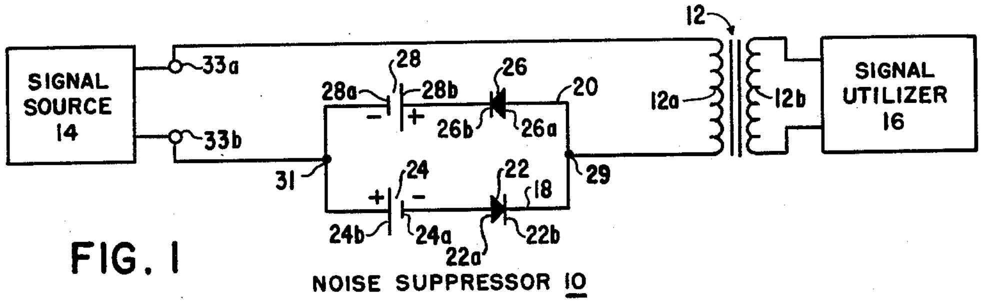
Figure 2:
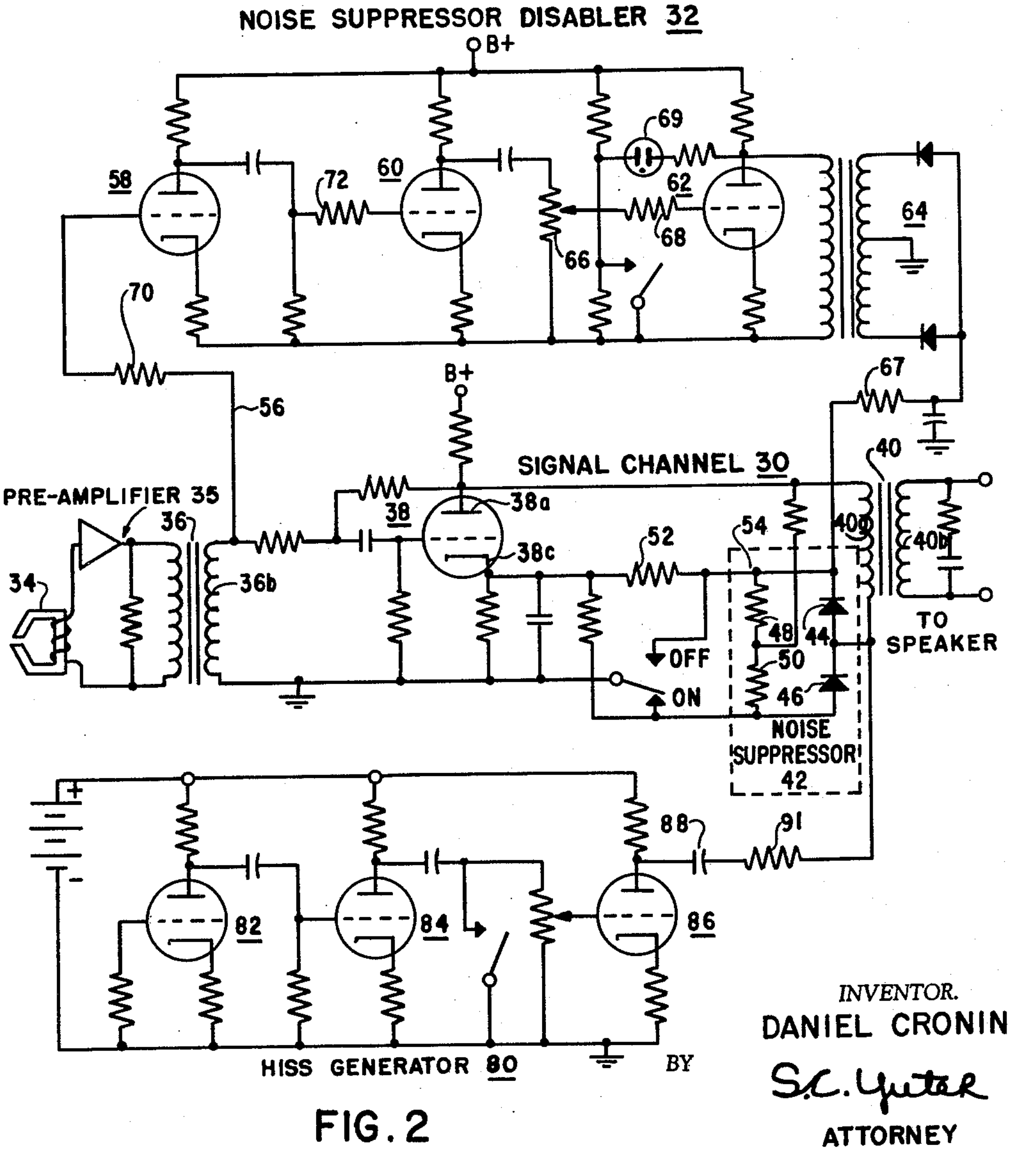

Other objects, features and advantages of the invention will be evident from the following detailed description when read in connection with the accompanying drawings wherein:

FIGURE 1 shows a background noise suppression circuit in accordance with one embodiment of the invention, and FIGURE 2 shows background noise suppression apparatus in accordance with another embodiment of the invention, which includes a hiss generator and an "anti-distortion" feature.

Referring to FIGURE 1, a noise suppressor 10, in accordance with one embodiment of the invention, is shown associated with the circuit of the transformer 12 which couples a signal source 14 to a signal utilizer 16 such as a loud-speaker. In general, an alternating current signal is transmitted from the signal source 14 via the transformer 12 to the signal utilizer 16. The alternating current signals from the signal source 14 usually include, in addition to the desired signals, low level noise signals which under some circumstances are undesirable when heard from a speaker. Accordingly, the noise suppressor 10 in series with the primary winding 12*a* of the transformer 12 prevents transmission of those portions of signals below a given amplitude centered about the zero voltage axis.

The noise suppressor 10 includes a pair of parallel branches 18 and 20, the first parallel branch 18 including the diode 22 in series with a potential source 24, and the second parallel branch 20 including the diode 26 in series with the potential source 28. The anode 26*a* of the diode 26 is coupled to the cathode 22*b* of the diode 22 at the junction 29, which is connected to the lower leg of the primary winding 12*a*. The negative terminal 28*a* of the potential source 28 is coupled to the positive terminal 24*b* of the potential source 24 at the junction 31 which is responsive to the signal source 14. Each of the sources of potential 24 and 28 produces a voltage of suitable amplitude for back biasing the diodes 22 and 26.

In particular, the diode 26 will pass all signals of one polarity having amplitudes greater than the potential of the potential source 28, and the diode 22 will pass all signals of the opposite polarity having amplitudes greater than the potential of the potential source 24. For example, assume that the potential sources 24 and 28 each generates a potential of $\frac{2}{10}$ of a volt and that the signals from the signal source 14 have a peak to peak amplitude of two volts. That is, the signals swing positive one volt from the zero value and swing negative one volt below the zero value. When the signal is one volt positive, a current flows from the terminal 33*a* through the primary winding 12*a* and the diode 26 to the terminal 33*b*. This current flow continues until the input signal is approximately $\frac{2}{10}$ of a volt positive. At this time, the potential difference across the diode 26 is zero and any further decrease in the amplitude of the input signal results in nonconduction of the diode 26 and current flow ceases.

Thus, no signal is thereafter received by the signal utilizer 16.

As the input signal further decreases, current does not start flowing until the input signal approaches the $\frac{2}{10}$ of a volt negative value. At this point the diode 22 starts conducting and continues to conduct during negative signal excursions until the input signal returns to a negative amplitude of $\frac{2}{10}$ of a volt. At that point, the diode 22 becomes nonconducting and no current again flows until the input signal has an amplitude greater than $\frac{2}{10}$ of a volt positive. Thus, for example, when a sinusoidal signal having a peak to peak amplitude of one volt is transmitted from the signal source 14, a signal is transferred to the signal utilizer 16. The signal is essentially a sinusoid but has a slice missing in a region $\frac{2}{10}$ of a volt positive and negative of the zero or center axis. Since noise signals are signals usually in this $\frac{2}{10}$ of a volt region, their transmission is prevented by the noise suppressor 10.

Although the circuit of FIGURE 1 is useful in many applications, there are other applications where the slicing effect which is always present is undesirable. In these applications, it is more desirable to have the noise suppressor operate only when desired information signals are not being transmitted and to be inoperative during the transmission of desired information signals. In particular applications associated with reproducing oral programs that are recorded on a magnetic tape, there are usually pauses between words and sentences. Any noise occurring during the reproducing of the actual speech is usually masked by the speech itself but the noise occurring between the words and sentences is not masked. It is this noise which should be suppressed, particularly when the noise contains pre-echoes or post-echoes on the magnetic tape.

Accordingly, FIGURE 2 shows apparatus in accordance with a second embodiment of the invention which permits the suppression of the noise occurring between vocal passages, but without the "center-slicing" distortion produced by the circuit of FIGURE 1. The apparatus includes the signal channel 30 and the noise suppressor disabler 32 responsive to the signals received from a magnetic reproducing head 34. The output of the signal channel 30 is coupled to a speaker (not shown) of conventional design. Signals from the magnetic reproducing head 34 are transmitted via the transformer 36 to the amplifier 38. The amplified signals are transferred via the transformer 40 to the speaker. In particular, these signals induce a current flow which is essentially from the anode **38*a* of the vacuum tube amplifier 38 through the primary winding 40*a* and the noise suppressor 42. As long as the signals are greater than a predetermined amplitude, there is a current flow. However, when the signals are below the predetermined amplitude, no current passes through the noise suppressor 42** and no signal is transmitted to the speaker.

The noise suppressor 42, which operates in a similar manner as the noise suppressor 10, comprises a first branch having a diode 46 and a resistor 50 in series. A second branch of the noise suppressor 42 includes the diode 44 and the resistor 48 in series. The resistors 48 and 50 are the sources of potential required to back bias the diodes 44 and 46. The cathode bias voltage of the amplifier 38 is fed via the resistor 52 to the junction 54 to develop the biasing potentials across the resistors 48 and 50. Thus, whenever signals below an amplitude which is related to the biasing potential are transmitted from the amplifier 38, the noise suppressor 42 blocks these signals. In particular, when the pre-echo or post-echo signals are fed from the magnetic recording head 34 to the amplifier 38 via the pre-amplifier 35, these signals are not transmitted to the speaker because of the action of the noise suppressor 42.

When signals having amplitudes greater than the pre-echo or post-echo noise are received, it is necessary to disable the noise suppressor to prevent distortion in the output signals. For this purpose, the noise suppressor disabler 32 is coupled via the line 56 to the secondary winding **36*b* of the transformer 36. All signals from the magnetic reproducing head 34 are therefore received by the noise disabler 32. The signals are amplified by the amplifiers 58 and 60. The signal from the amplifier 60 is transmitted to the threshold amplifier 62. By a suitable adjustment of the resistor 66 (which is facilitated by neon indicator 69 which when lit indicates sufficient voltage present to debias the diodes 44 and 46), only signals greater than a predetermined amplitude are amplified for transmission to the full wave rectifier 64. More particularly, when only background noise signals are being received, the threshold amplifier 62 transmits no signals, but when the high level desired signals are being received, the threshold amplifier 62** transmits signals.

The transmitted signals are rectified by the full wave rectifier 64 to generate a negative direct current voltage which is fed via the resistor 67 to the junction 54 in the signal channel 30. The negative a signal transmitted from the full wave rectifier 64 via the resistor 67 to the junction 54 overrides the potential from the cathode **38*c* of the amplifier 38 and there is no back biasing of the diodes 44 and 46. Therefore, all signals transmitted from the amplifier 38 pass through the noise suppressor 42** and no distortion is present on the signals transmitted to the speaker.

It should be noted that the amplifiers of the noise suppressor disabler 32 have the following requirements: they must produce full output on a very small signal and only a slight increase of output with a large increase of input signal. Further, there must be no tendency for cut-off bias to accumulate on any of the control grids; therefore, grid-stopping resistors such as the resistors 70 and 72 are included.

It should further be noted that the time constants associated with the noise suppressor disabler 32 are chosen to make the voltage rise in about one millisecond and decay more slowly. Theoretically, the first millisecond or so of each word is still distorted but this is not noticed in practice. The ear requires much more than a millisecond to become conscious of distortion. Psychoacoustics also permit a delay in recovery at the end of the word. Thus, there is a carry-over of the masking effect for a fraction of a second after the end of the word so that background print-through will not be heard even if it is present within a few milliseconds of the end of the word.

There has thus been shown an improved means for suppressing background noise without distorting the desired signal. The apparatus is ideally suited for suppressing in the reproduction of signals from a magnetic tape spurious echoes resulting from print-through between adjacent turns of the magnetic tape when stored on a reel.

When employing the apparatus of FIGURE 2 as described thus far in a reproducer of oral programs where there is a pause between sentences, the suppression of all low level noise creates the impression of severe modulation noise. The pauses between words and phrases have an unreal sounding silence since each work reproduced is usually accompanied by some background noise such as tape hiss. Accordingly, a hiss generator 80 is included in the apparatus of FIGURE 2 to simulate this expected background noise. Shot effect and induced grid noise in the plate current of the triode 82, which is operated with reduced filament voltage, is amplified by the amplifiers 84 and 86 and transmitted via the capacitor 88 and resistor 91 to the primary winding **40*a* of the transformer 40. When the noise suppressor 42 is operating, the diodes 44 and 46 are open circuited and the hiss voltage is developed across the primary winding 40*a*. When the noise suppressor disabler 32 is operating, the diodes 44 and 46 are conducting and the hiss voltage is effectively short circuited to ground. Thus, the hiss voltage is added only when wanted. Since the internally generated hiss does not reach the output to the signal utilizer 16 at the same time the hiss from the signal source 14** does, the total effective hiss is not increased. If the original program material should contain low level hum, rumble, air conditioner noise, etc., this will be suppressed also. Reinsertion of noise of this type is neither necessary nor desirable. Even though the noise comes through each word, it is largely masked during this time and the subjective effect is more pleasing if the noise is suppressed.

There has thus been shown not only improved means for suppressing pre-magnetic tape echo and post-magnetic tape echo, but also means for simulating and injecting desirable hiss voltages into the reproducing apparatus associated with magnetic tape recorders.

Although only a few embodiments of the invention have been shown and described in detail, there will be obvious to those skilled in the art, many modifications and variations accomplishing the foregoing objects, but which do not depart essentially from the spirit of the invention.

What is claimed is:

1. Apparatus for suppressing low level spurious or noise signals generated in the reproduction of signals recorded on a magnetic tape, said apparatus comprising a magnetic head for reproducing the signals recorded on the magnetic tape, a linear amplifying means responsive to the signals from said magnetic head for amplifying reproduced signals, an output means responsive to said amplifying means for transmitting amplified signals, a signal blocking means serially interposed between said amplifying means and said output means for selectively blocking the transmission of amplified signals of either polarity, and a biasing means associated with said signal blocking means for establishing an amplitude value for controlling said blocking means to block all signals having amplitudes below said amplitude value, said biasing means serving to determine a maximum amplitude value such that said blocking means blocks all signals having amplitudes less than the maximum value, and additional control means responsive to said magnetic head, said additional control means being activated upon receipt of signals of greater than said predetermined amplitude for deactivating said biasing means to prevent the blocking of signals by said blocking means.

2. Apparatus for suppressing background noise signals on magnetic tape said apparatus comprising a reproducing head for reproducing signals recorded on the magnetic tape, an amplifier responsive to signals from said reproducing head to amplify reproduced signals, an output circuit responsive to said amplifier to transmit the amplified signals, first and second diodes disposed in a parallel circuit, said first and second diodes being oppositely polarized, said parallel circuit being serially interposed between said amplifier and said output circuit, biasing means for biasing said first and second diodes, said biasing means cooperating with said first and second diodes to prevent the transmission of signals having less than a predetermined amplitude, and a control means also responsive to signals from said reproducing head, said control means being activated when receiving signals greater than a minimum amplitude, and serving to control said first and second diodes, said control means when so activated generating a signal for over-riding said biasing means to permit the transmission of signals having less than the predetermined amplitude.

3. The apparatus of claim 2 including a hiss generator coupled to said amplifier circuit for injecting a hiss signal into the output circuit.

4. Apparatus for suppressing the transmission to a speaker of magnetic ghosts reproduced from a magnetic tape comprising a reproducing head for reproducing signals recorded on the magnetic tape, a first amplifier responsive to said reproducing head for amplifying the reproduced signals, an output circuit associated with said first amplifier for transmitting the amplified signals to the speaker, first and second diodes in parallel relationship disposed serially in said output circuit, said first and second diodes being oppositely polarized, first and second biasing means respectively in series with said first and second diodes, means for establishing predetermined biasing potentials on said biasing means to maintain said diodes non-conducting when the signals being transmitted from said first amplifier are below a minimum amplitude, a second amplifier responsive to said recording head, said second amplifier being biased to amplify signals having greater than a minimum amplitude, an output means associated with said second amplifier, said output means associated with said second amplifier including means for rectifying alternating current signals, said first and second biasing means being responsive to the output means of said second amplifier, the signals generated by the output means of said second amplifier decreasing the established biasing potentials to maintain said diodes conducting regardless of the minimum amplitude of the signals transmitted by the output means of said first amplifier.

5. The apparatus of claim 4 including a hiss generator coupled to the output means of said first amplifier to inject a characteristic signal for reproduction by the speaker when said diodes are nonconducting.

6. The apparatus of claim 1 including delayed control means responsive to the amplitude of signals from the signal source for controlling the amplitudes of the potentials of the sources of potentials for preventing distortion of signals during brief intervals of low level signals from said signal source.

References Cited in the file of this patent

UNITED STATES PATENTS

| | | |
|---|---|---|
| 2,171,671 | Percival | Sept. 5, 1939 |
| 2,281,395 | Travis | Apr. 28, 1942 |
| 2,339,465 | Dudley | Jan. 18, 1944 |
| 2,519,890 | Crosby | Aug. 22, 1950 |
| 2,533,803 | Hings | Dec. 12, 1950 |
| 2,632,815 | Crespinel | Mar. 24, 1953 |
| 2,883,480 | Grenier | Apr. 21, 1959 |
| 2,902,543 | Vilbig | Sept. 1, 1959 |